United States Defensive Publication [19] (H) [11] T984,002

Faul et al. [43] Jul. 3, 1979

[54] METHOD OF PRODUCING REVERSAL COLOR IMAGES

[76] Inventors: William H. Faul; Patrick H. Saturno, both c/o Kodak Park Division, Rochester, N.Y. 14650

[21] Appl. No.: 910,398

[22] Filed: May 30, 1978

Related U.S. Application Data

[63] Continuation of Ser. No. 662,308, Mar. 1, 1976, abandoned, which is a continuation-in-part of Ser. No. 487,084, Jul. 10, 1974, abandoned.

[51] Int. Cl.[2] ..... G03C 5/50; G03C 7/16

[52] U.S. Cl. ..... 96/59; 96/22

[57] ABSTRACT

Reversal color images are produced in photographic elements which contain a ballasted primary aromatic amine and conventional ballasted color couplers. The photographic element is imagewise-exposed and a negative silver image is formed without forming a dye image. The residual silver halide in the photographic element is then fogged and developed to silver while concurrently forming a color dye image in the nonimagewise-exposed areas of the element. The developed silver is removed without removing the dye image.

5 Claims, No Sheets Drawing,

31 Pages Specification

The file of this unexamined application may be inspected and copies thereof may be purchased (849 O.G. 1221, Apr. 9, 1968).